United States Patent
Cameron et al.

(10) Patent No.: US 12,288,148 B1
(45) Date of Patent: *Apr. 29, 2025

(54) SYSTEM AND METHOD FOR CONSTRUCTING A LAYERED ARTIFICIAL INTELLIGENCE MODEL

(71) Applicant: Citibank, N.A., New York, NY (US)

(72) Inventors: William Franklin Cameron, Jacksonville, FL (US); Miriam Silver, Tel Aviv (IL); Manjit Rajaretnam, Irving, TX (US)

(73) Assignee: CITIBANK, N.A., NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/932,531

(22) Filed: Oct. 30, 2024

Related U.S. Application Data

(63) Continuation of application No. 18/737,942, filed on Jun. 7, 2024, now Pat. No. 12,154,019.

(51) Int. Cl.
| | |
|---|---|
| *G06N 3/04* | (2023.01) |
| *G06N 3/08* | (2023.01) |
| *G06N 3/082* | (2023.01) |
| *G06N 20/00* | (2019.01) |

(52) U.S. Cl.
CPC ............ *G06N 3/04* (2013.01); *G06N 3/08* (2013.01); *G06N 3/082* (2013.01); *G06N 20/00* (2019.01)

(58) Field of Classification Search
CPC ............ G06N 3/02; G06N 3/04; G06N 3/042; G06N 3/044; G06N 3/08; G06N 3/082; G06N 3/09; G06N 3/091; G06N 3/092; G06N 20/00; G06N 20/10; G06N 20/20; G06N 5/045
See application file for complete search history.

(56) References Cited

U.S. PATENT DOCUMENTS

| | | |
|---|---|---|
| 8,380,817 B2 | 2/2013 | Okada |
| 8,387,020 B1 | 2/2013 | Maclachlan et al. |
| 10,426,442 B1 | 10/2019 | Schnorr |
| (Continued) | | |

FOREIGN PATENT DOCUMENTS

| | | |
|---|---|---|
| CN | 115796299 A | 3/2023 |
| CN | 116775837 A | 9/2023 |
| (Continued) | | |

OTHER PUBLICATIONS

AI Risk Management Framework NIST, retrieved on Jun. 17, 2024, https://www.nist.gov/itl/ai-risk-management-framework.

(Continued)

*Primary Examiner* — Shane D Woolwine
(74) *Attorney, Agent, or Firm* — Perkins Coie LLP

(57) ABSTRACT

Systems and methods for constructing a layered artificial intelligence (AI) model are provided. The technology determines a set of layers and a set of variables for each layer for the AI model, with each layer relating to a specific domain context of the AI model. Using the layers, the AI model is trained to create layer-specific model logic for each layer using the variables of the layer. By applying the layer-specific model logic to incoming command sets, the model produces detailed layer-specific responses. The trained AI model then generates overall responses to command sets by aggregating the layer-specific responses, along with weights for each layer.

20 Claims, 7 Drawing Sheets

(56) References Cited

U.S. PATENT DOCUMENTS

| | | |
|---|---|---|
| 10,620,988 B2 | 4/2020 | Lauderdale et al. |
| 11,133,942 B1 | 9/2021 | Griffin |
| 11,164,078 B2 | 11/2021 | Jin et al. |
| 11,410,136 B2 | 8/2022 | Cook et al. |
| 11,470,106 B1 | 10/2022 | Lin et al. |
| 11,503,075 B1 | 11/2022 | Sirianni et al. |
| 11,521,716 B2 | 12/2022 | Vianu et al. |
| 11,652,839 B1 | 5/2023 | Aloisio et al. |
| 11,681,811 B1 | 6/2023 | Dixit |
| 11,683,333 B1 | 6/2023 | Dominessy et al. |
| 11,706,241 B1 | 7/2023 | Cross et al. |
| 11,720,686 B1 | 8/2023 | Cross et al. |
| 11,734,418 B1 | 8/2023 | Epstein |
| 11,893,341 B2 | 2/2024 | Itani |
| 12,001,462 B1 | 6/2024 | Madisetti et al. |
| 12,061,970 B1 | 8/2024 | Lo et al. |
| 2003/0007178 A1 | 1/2003 | Jeyachandran et al. |
| 2004/0098454 A1 | 5/2004 | Trapp et al. |
| 2005/0204348 A1 | 9/2005 | Horning et al. |
| 2006/0095918 A1 | 5/2006 | Hirose |
| 2007/0067848 A1 | 3/2007 | Gustave et al. |
| 2010/0275263 A1 | 10/2010 | Bennett et al. |
| 2010/0313189 A1 | 12/2010 | Beretta et al. |
| 2014/0137257 A1 | 5/2014 | Martinez et al. |
| 2014/0258998 A1 | 9/2014 | Adl-Tabatabai et al. |
| 2014/0297954 A1 | 10/2014 | Clevenger |
| 2017/0061132 A1 | 3/2017 | Hovor et al. |
| 2017/0295197 A1 | 10/2017 | Parimi et al. |
| 2018/0239903 A1 | 8/2018 | Bodin et al. |
| 2018/0307894 A1 | 10/2018 | Lim et al. |
| 2018/0343114 A1 | 11/2018 | Ben-Ari |
| 2019/0188706 A1 | 6/2019 | Mccurtis |
| 2019/0236661 A1 | 8/2019 | Hogg et al. |
| 2019/0286816 A1 | 9/2019 | Fu |
| 2020/0012493 A1 | 1/2020 | Sagy |
| 2020/0043164 A1 | 2/2020 | Fuchs et al. |
| 2020/0074470 A1 | 3/2020 | Deshpande et al. |
| 2020/0153855 A1 | 5/2020 | Kirti et al. |
| 2020/0259852 A1 | 8/2020 | Wolff et al. |
| 2020/0309767 A1 | 10/2020 | Loo et al. |
| 2020/0314191 A1 | 10/2020 | Madhavan et al. |
| 2020/0334326 A1 | 10/2020 | Zhang et al. |
| 2020/0349054 A1 | 11/2020 | Dai et al. |
| 2020/0349466 A1 | 11/2020 | Hoogerwerf et al. |
| 2021/0012486 A1 | 1/2021 | Huang et al. |
| 2021/0049288 A1 | 2/2021 | Li |
| 2021/0133182 A1 | 5/2021 | Anderson et al. |
| 2021/0185094 A1 | 6/2021 | Waplington et al. |
| 2021/0211431 A1 | 7/2021 | Albero et al. |
| 2021/0264547 A1 | 8/2021 | Li |
| 2021/0273957 A1 | 9/2021 | Boyer et al. |
| 2021/0390465 A1 | 12/2021 | Werder et al. |
| 2022/0004923 A1 | 1/2022 | Kamkar et al. |
| 2022/0114251 A1 | 4/2022 | Guim Bernat et al. |
| 2022/0147636 A1 | 5/2022 | Mahuli et al. |
| 2022/0198304 A1 | 6/2022 | Szczepanik et al. |
| 2022/0286438 A1 | 9/2022 | Burke et al. |
| 2022/0303302 A1 | 9/2022 | Hwang et al. |
| 2022/0327620 A1 | 10/2022 | Ndoutoumou |
| 2022/0334818 A1 | 10/2022 | Mcfarland |
| 2022/0342846 A1 | 10/2022 | Kunchakarra et al. |
| 2022/0345457 A1 | 10/2022 | Jeffords et al. |
| 2022/0368728 A1 | 11/2022 | Murray et al. |
| 2022/0377093 A1 | 11/2022 | Crabtree et al. |
| 2022/0398149 A1 | 12/2022 | Mcfarland et al. |
| 2022/0400135 A1 | 12/2022 | Gamra |
| 2022/0414213 A1 | 12/2022 | Dixit |
| 2022/0417274 A1 | 12/2022 | Madanahalli et al. |
| 2023/0007039 A1 | 1/2023 | Waplington |
| 2023/0018960 A1 | 1/2023 | Ardel |
| 2023/0019072 A1 | 1/2023 | Okunlola |
| 2023/0032686 A1 | 2/2023 | Williams et al. |
| 2023/0033317 A1 | 2/2023 | Lin et al. |
| 2023/0035321 A1 | 2/2023 | Vijayaraghavan |
| 2023/0039855 A1 | 2/2023 | Greene |
| 2023/0052608 A1 | 2/2023 | Wattiau et al. |
| 2023/0067128 A1 | 3/2023 | Engelberg et al. |
| 2023/0071264 A1 | 3/2023 | Hakala et al. |
| 2023/0076372 A1 | 3/2023 | Engelberg et al. |
| 2023/0077527 A1 | 3/2023 | Sarkar |
| 2023/0113621 A1 | 4/2023 | Griffin et al. |
| 2023/0114719 A1 | 4/2023 | Thomas et al. |
| 2023/0117962 A1 | 4/2023 | Kaimal et al. |
| 2023/0118388 A1 | 4/2023 | Crabtree et al. |
| 2023/0123314 A1 | 4/2023 | Crabtree et al. |
| 2023/0132703 A1 | 5/2023 | Marsenic et al. |
| 2023/0135660 A1 | 5/2023 | Chapman et al. |
| 2023/0164158 A1 | 5/2023 | Fellows et al. |
| 2023/0171282 A1 | 6/2023 | Bollinger |
| 2023/0177613 A1 | 6/2023 | Crabtree et al. |
| 2023/0205888 A1 | 6/2023 | Tyagi et al. |
| 2023/0205891 A1 | 6/2023 | Yellapragada et al. |
| 2023/0208869 A1 | 6/2023 | Bisht et al. |
| 2023/0208870 A1 | 6/2023 | Yellapragada et al. |
| 2023/0208871 A1 | 6/2023 | Yellapragada et al. |
| 2023/0229542 A1 | 7/2023 | Watkins et al. |
| 2023/0259860 A1 | 8/2023 | Sarkar |
| 2023/0269272 A1 | 8/2023 | Dambrot et al. |
| 2023/0274089 A1 | 8/2023 | Tunstall-Pedoe et al. |
| 2023/0316003 A1 | 10/2023 | Friedman et al. |
| 2024/0095463 A1 | 3/2024 | Leary et al. |
| 2024/0111960 A1 | 4/2024 | Earle et al. |
| 2024/0146734 A1 | 5/2024 | Southgate et al. |
| 2024/0202539 A1 | 6/2024 | Poirier et al. |
| 2024/0242040 A1 | 7/2024 | Cogswell et al. |
| 2024/0273306 A1 | 8/2024 | Somaiya et al. |
| 2024/0330466 A1 | 10/2024 | Constable et al. |
| 2024/0333741 A1* | 10/2024 | Abdelrahman ..... H04L 63/1425 |
| 2024/0338387 A1* | 10/2024 | Iscen .................. G06V 10/761 |

FOREIGN PATENT DOCUMENTS

| | | |
|---|---|---|
| CN | 117391216 A | 1/2024 |
| CN | 117453915 A | 1/2024 |
| CN | 117633174 B | 6/2024 |
| CN | 118170874 A | 6/2024 |
| WO | 2022135973 A1 | 6/2022 |
| WO | 2023161630 A1 | 8/2023 |

OTHER PUBLICATIONS

Independent analysis of AI language models and API providers. Artificial Analysis, retrieved on Jun. 13, 2024, https://artificialanalysis.ai/, 11 pages.

Brown, D., et al., "The Great AI Challenge: We Test Five Top Bots on Useful, Everyday Skills," The Wall Street Journal, published May 25, 2024.

Brown, Nik Bear, "Enhancing Trust in LLMs: Algorithms for Comparing and Interpreting LLMs", ARXIV ID: 2406.01943 Publication Date: Jun. 3, 2024, pp. 1-58. (Year: 2024).

Chen, Kua, et at., Automated Domain Modeling with Large Language Models: A Comparative Study, 2023 ACM/IEEE 26th International Conference on Model Driven Engineering Languages and Systems (Models) (2023, pp. 162-172) (Year: 2023).

Dakhel et al., Apr. 2024, "Effective test generation using pre-trained Large Language Models and mutation testing" (Year: 2024).

Do et al., "Automatic Prompt Selection for Large Language Models" (Year: 2024) Apr. 3, 2024.

Dong, Y., et al., "Building Guardrails for Large Language Models," https://ar5iv.labs.arxiv.org/html/2402.01822v1, published May 29, 2024, 20 pages.

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Mathews, A. W., "What AI Can Do in Healthcare—and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

(56) References Cited

OTHER PUBLICATIONS

Mollick, E., "Latent Expertise: Everyone is in R&D," One Useful Thing, published on Jun. 20, 2024, https://www.oneusefulthing.org/p/latent-expertise-everyone-is-in-r.
Wang, Yudong, et al., "Exploring Activation Patterns of Parameters in Language Models", ARXIV ID: 2405.17799 Publication Date: May 27, 2024, pp. 1-23. (Year: 2024).
Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.
Zhao, H., et al., "Explainability for Large Language Models: A Survey," https://arxiv.org/abs/2309.01029, Nov. 28, 2024, 38 pages.
Aggarwal, Nitin, "Why measuring your new AI is essential to its success", KPIs for gen AI: Why measuring your new AI is essential to its success, 7 pages.
"What is AI Verify?", AI Verify Foundation, Jun. 11, 2024, 3 pages, https://aiverifyfoundation.sg/.
Futurism, "Sam Altman Admits That OpenAI Doesn't Actually Understand How Its AI Works", Jun. 11, 2024, 4 pages, https://futurism.com/sam-altman-admits-openai-understand-ai.
Anthrop/C, "Mapping the Mind of a Large Language Model", Mapping the Mind of a Large Language Model, May 21, 2024.
Claburn, Thomas, "OpenAI's GPT-4 can exploit real vulnerabilities by reading security advisories", OpenAI's GPT-4 can exploit real vulnerabilities by reading security advisories, Apr. 17, 2024, 3 pages.
Marshall, Andrew, "Threat Modeling AI/ML Systems and Dependencies", Threat Modeling AI/ML Systems and Dependencies, Nov. 2, 2022, 27 pages.
Roose, Kevin, "A.I. Has a Measurement Problem", A.I. Has a Measurement Problem, Apr. 15, 2024, 5 pages.
Roose, Kevin, "A.I.'s Black Boxes Just Got a Little Less Mysterious", A.I.'s Black Boxes Just Got a Little Less Mysterious, May 21, 2024, 5 pages.
Shah, Harshay, "Decomposing and Editing Predictions by Modeling Model Computation", Decomposing and Editing Predictions by Modeling Model Computation, 5 pages.
Shankar, Ram, "Failure Modes in Machine Learning", Nov. 2019, 14 pages.
Teo, Josephine, "Singapore launches Project Moonshot", Singapore launches Project Moonshot—a generative Artificial Intelligence testing toolkit to address LLM safety and security challenges, May 31, 2024, 8 pages.
Naveed et al, 2023, "A Comprehensive Overview of Large Language Models" (Year: 2023).
Cranium, Adopt & Accelerate AI Safely, retrieved on Nov. 7, 2024, from https://cranium.ai/.
Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.
International Search Report and Written Opinion Received received in Application No. PCT/US23/85942, dated Feb. 15, 2024, 6 pages.
Malode, 2023, "Benchmarking public large language model" (Year: 2023).
Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv. /abs/2409.10102.

\* cited by examiner

SYSTEM AND METHOD FOR CONSTRUCTING A LAYERED ARTIFICIAL INTELLIGENCE MODEL

BACKGROUND

This application is a continuation of U.S. patent application Ser. No. 18/737,942, filed on Jun. 7, 2024, which is hereby incorporated by reference in its entirety.

CROSS-REFERENCE TO RELATED APPLICATION

Artificial intelligence (AI) models often operate based on extensive and enormous training models. The models include a multiplicity of inputs and how each should be handled. When the model receives a new input, the model produces an output based on patterns determined from the data the model was trained on. AI models provide a more dynamic and nuanced approach to security by continuously analyzing vast amounts of data to identify potential threats and vulnerabilities. However, there is a lack of transparency in AI models. Unlike traditional rule-based methods and signature-based detection techniques, which are more transparent, AI models operate on algorithms that are often opaque to end-users since the user is only exposed to the AI model's received input and the AI model's output. The lack of visibility into the inner workings of AI models raises concerns about the AI model's reliability and trustworthiness, as security analysts are unable to verify the integrity of the AI model or assess the AI model's susceptibility to adversarial attacks.

Figure 1:
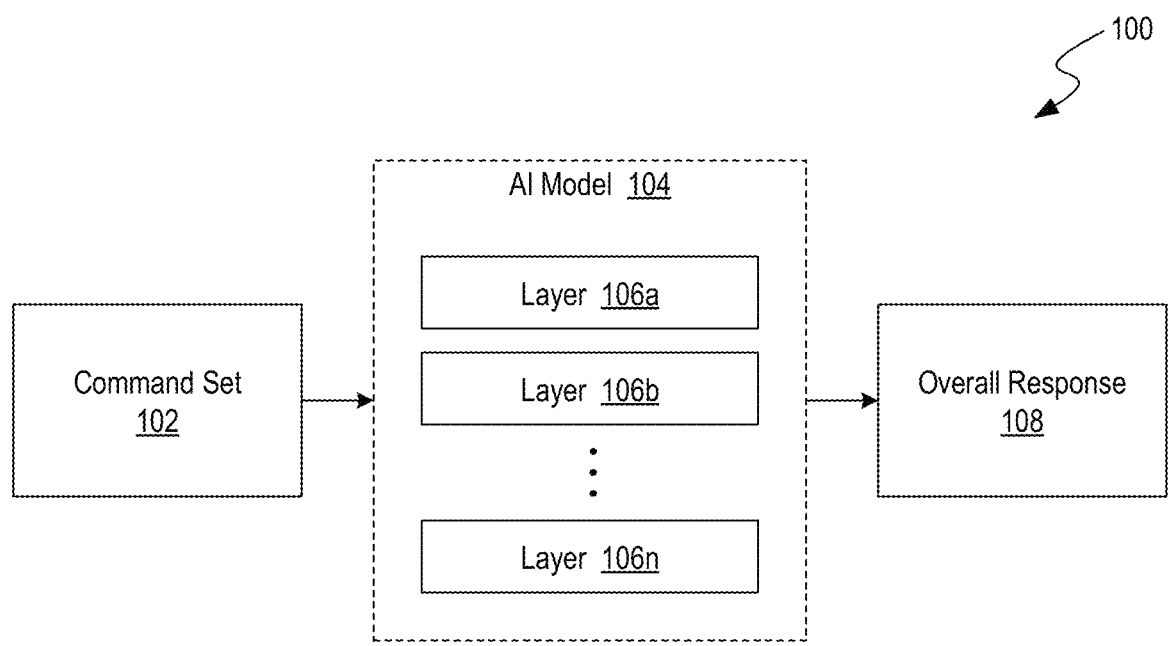
FIG. 1 is an illustrative diagram illustrating an example environment of a layered artificial intelligence (AI) model, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

AI applications offer a powerful framework for extracting insights and making predictions from data. One of the key advantages of AI applications lies in an AI model's ability to automatically identify patterns and relationships within complex datasets, even in the absence of explicit programming. This capability enables AI applications to uncover relationships, predict future outcomes, and drive data-driven decision-making across various fields. However, the rapid deployment and integration of LLMs have raised significant concerns regarding their risks including, but not limited to, ethical use, data biases, privacy and robustness. Further, as AI technologies continue to evolve, so do the regulatory landscapes governing the created AI applications. AI applications face increasing scrutiny and legal obligations to ensure that AI applications comply with the evolving regulations and ethical standards.

Traditional approaches to using AI models, for example, to secure computing platforms typically involve users providing an input (e.g., a command set or prompt) and receiving output predictions. However, the inner workings of the AI model, including the algorithms and decision-making processes employed, remain opaque to the user. From the user's perspective, the AI model functions as a "black box," where the input is fed into the system, and the output prediction is produced without visibility into the underlying logic. Once the input data is processed by the AI model, users receive output predictions (e.g., in a cybersecurity context, an AI model could indicate whether each access attempt is deemed authorized or unauthorized). These predictions can inform security decisions and actions taken by users or automated systems. Since the AI model is a "black box," attempts to prevent unwanted AI model outputs include filtering out potentially risky inputs using predefined rulesets but do not the root cause of the problem (e.g., being unable to understand the decision-making processes the AI model). Without understanding how the AI model processes information and generates outputs, simply filtering inputs through pre-defined rules is a superficial measure that can easily be circumvented or fail to catch unforeseen risky inputs. Moreover, this approach does not improve the model's underlying reliability or transparency.

A common issue faced by engineers due to the lack of visibility into AI algorithm logic is the inability to validate the accuracy and effectiveness of the AI model's outputs. Security professionals require confidence in the methodologies used by AI models to make informed decisions about platform security. Without a clear understanding of the underlying logic, engineers may be hesitant to trust the outputs of AI models.

Moreover, the lack of transparency into AI algorithm logic hinders efforts to diagnose and address security vulnerabilities effectively. In the event of a security breach or incident, engineers need to understand how the AI model arrived at its conclusions to identify the root cause of the problem and implement appropriate remediation measures. However, without insight into the decision-making process of the algorithms, diagnosing and resolving security issues becomes significantly more challenging.

Additionally, the lack of visibility into AI algorithm logic can exacerbate concerns about adherence to regulations or guidelines. If engineers cannot discern how AI models weigh different factors or make decisions, it becomes difficult to ensure that the algorithms adhere to the regulations or guidelines. The opacity may lead to unintended consequences, such as disproportionate impacts on certain user groups or overlooking security vulnerabilities.

Moreover, the need to work with multiple requirements/dimensions (such as, compliance with regulations; ethical principles such as fairness, privacy, and IP; ensuring outputs free from unintended responses such as offensive or hate speech; ensuring outputs free from incorrect/unsubstantiated responses/hallucinations; etc.) makes the challenges worse, especially when some requirements can be conflicting. Such complexity requires a sophisticated solution system.

Thus, there is a need for determining particular explanations of particular AI model outcomes. The inventors have developed an improved method and system for constructing a layered AI model that covers the development cycle (from requirements, to design, implementation, integration, deployment, verification and validation) of AI models. The method involves constructing a layered AI model by determining a set of layers, where each layer relates to a specific context/dimension. Within each layer, a set of variables is defined to capture attributes identified within the corresponding context. The variables serve as parameters for the layer-specific model logic, which generates layer-specific results in response to inputs. To construct the layered AI model, the determined set of layers is used to train an AI model. This training process involves developing layer-specific model logic for each layer, tailored to generate layer-specific results based on the corresponding set of variables. Once trained, the AI model is capable of applying the layer-specific model logic of each layer to a command set, thereby generating layer-specific responses. These responses include the layer-specific results and a set of descriptors indicating the model logic used for each layer. After generating layer-specific responses, the system aggregates them using predetermined weights for each layer. This aggregation process yields a set of overall responses to the command set, comprising an overall result and an overall set of descriptors associated with the layer-specific responses. These descriptors provide insights into the decision-making process of the AI model, allowing users to understand how each layer contributes to the overall result.

In various implementations, the system receives an indicator of the application type associated with the AI model, identifies a relevant set of layers based on this indicator, and obtains the corresponding set of layers via an Application Programming Interface (API). Additionally, the system can dynamically determine the set of layers using machine learning algorithms or based on received input indicating specific contexts associated with the AI model. In various implementations, the determination of the set of layers for the AI model can be dynamically adjusted based on real-time feedback and observations. This dynamic approach involves continuously monitoring the performance and effectiveness of the existing layers and adjusting the set of layers accordingly. For example, if new security threats or vulnerabilities are identified, additional layers can be introduced to address these specific concerns. Conversely, if certain layers are found to be redundant or ineffective, they can be removed or modified to improve the overall performance of the AI model.

Using a layered AI model, the system allows users to understand the specific contexts and variables considered at each layer, and thus offers the user a particular explanation for particular outcomes of the AI model. Each layer's model logic is constructed based on identifiable parameters and attributes associated with the corresponding context, making it easier for users to validate the accuracy of the outputs and identify potential sources of error more effectively. By breaking down the AI model into interpretable layers, rather than the AI model operating as a "black box," users can gain a clearer understanding of how the model arrives at its predictions, instilling confidence in the decisions made based on the AI model's outputs.

Additionally, in the event of a disruption, such as a security breach or incident, engineers can trace back the layer-specific responses and descriptors generated by the model to understand how the model arrived at its conclusions. By evaluating the layer-specific responses and descriptors, engineers can identify the root cause of security issues and implement targeted remediation measures, thereby improving the overall security posture and efficiency of the computing platforms.

Further, the layered AI model mitigates concerns about regulation and guideline adherence by providing visibility into the factors considered and decisions made at each layer. By examining the layer-specific set of variables and descriptors, engineers can ensure that the AI model's assessments align with regulatory requirements and guidelines. Furthermore, using weights for each layer or ranking the layers allows the model to adjust its output according to the importance of each layer to the specific context.

In the following description, for the purposes of explanation, numerous specific details are set forth in order to provide a thorough understanding of the implantations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Constructing a Layered AI Model

FIG. 1 is an illustrative diagram of an example environment 100 of a layered artificial intelligence (AI) model, in accordance with some implementations of the present technology. Environment 100 includes a command set 102, AI model 104, layers 106a-106n within the AI model 104, and overall response 108. AI model 104 is implemented using components of example computer system 700 illustrated and described in more detail with reference to FIG. 7. Likewise, implementations of example environment 100 can include different and/or additional components or can be connected in different ways.

The command set 102 operates as an input into the AI model 104. The command set 102 consists of a set of instructions or queries directed toward the AI model, which can encompass a wide range of tasks or inquiries, depending on the specific application or use case of the AI model. For example, in a cybersecurity context, command set 102 can be a prompt that asks the AI model to predict whether an attempt to access a certain application is authentic. Command set 102, in a cybersecurity context, can range from routine security assessments and threat intelligence gathering to proactive threat hunting, incident response coordination, and remediation efforts. In another example, in a financial analysis setting, the command set 102 can consist of risk assessments for candidate loan applications. In some implementations, the command set can be structured in a standardized format to ensure consistency and interoperability across different interactions with the AI model.

Within the AI model 104 are multiple layers (e.g., layers 106*a-n*). Each layer 106*a-n* corresponds to a specific aspect or domain context relevant to the decision-making process within the AI model 104. Layers 106*a-n* can include specialized knowledge and logic tailored to specific domains or areas of expertise. For example, one layer can focus on demographic information, while another layer can analyze financial data or market trends. The particular layers 106*a-n* within the AI model 104 can incorporate relevant data sources, algorithms, and/or analytical techniques tailored to the specific context the particular addresses. The layers 106*a-n* can identify patterns and/or generate predictions or recommendations that contribute to the overall decision-making process of the AI model 104. In some implementations, layers 106*a-n* are augmented with additional capabilities such as machine learning (ML) models, natural language processing (NLP) algorithms, or domain-specific heuristics to enhance their effectiveness. Layers 106*a-n* can evolve over time in response to changing regulations or guidelines, emerging trends, or new insights identified by the AI model. Layers 106*a-n* within the AI model can also be versioned to accommodate evolving requirements and regulations. For instance, layers 106*a-n* tailored towards privacy regulations that apply in 2024 may differ significantly from those anticipated for 2030. By versioning layers 106*a-n*, the system can maintain and apply distinct sets of rules and guidelines that correspond to different regulatory frameworks over time.

The layers 106*a-n* within the AI model can include the overall layer's 108*a-n* function, as well as metrics on the logic used within the layers 106*a-n* (e.g., layer-specific model logic), such as weights, biases, and activation functions, which affects how the model processes information and arrives at its conclusions. Weights determine the importance of each input, biases adjust the output along certain dimensions, and activation functions control the signal propagation through the network. Further methods of using layers 106*a-n* to generate responses for the AI model 104 and modifying layers are discussed with reference to FIG. 2.

Example layers include, but are not limited to, demographics, current financial data (e.g., credit score), financial history, market conditions corporate strategy (e.g., tactical, strategic), geopolitical and systemic implications (e.g., tactical, strategic), corporate conditions, complexity of financial product, loss risk of the product, length of investment, buyout options, complexity of transaction, financial data and history of social graph, employment history, product applicability, operational and/or execution costs, and/or regulatory guidelines (e.g., regional, global).

For example, in a cybersecurity context, one layer can focus on network traffic analysis, and employ algorithms and techniques to identify anomalous patterns within network traffic that are indicative of potential cyber threats or malicious activities. A different layer can focus on regulatory compliance by ensuring that the AI model complies with cybersecurity jurisdictional and/or organizational regulations, such as regulations directed towards data privacy. In another example, in a financial context, one layer can focus on data quality, a second layer can focus on financial regulatory compliance, a third layer can focus on identifying bias, a fourth layer can be focused on uncertainty, and so on.

Layers 106*a-n* and their functions within the AI model can be versioned and stored along with metadata to enable reusability of the layers 106*a-n* and facilitate performance comparisons between the versioned layers. Each versioned layer can include metadata that captures the specific configurations, such as weights, biases, activation functions, and the regulatory or contextual parameters the versioned layer addressed. This approach enables the layers 106*a-n* to be reused across different models and applications.

As the command set 102 is processed through the AI model 104, the command set 102 traverses through each layer 106*a-n* sequentially, with each layer 106*a-n* constructing layer-specific model logic (which can be non-uniform) to generate layer-specific responses. For example, one layer can use signature-based detection methods to identify known malware threats, while another layer can use anomaly detection algorithms to detect suspicious behavior indicative of potential cyber-attacks. Layer-specific responses generated by each layer can provide actionable insights specific to a particular layer to enhance cybersecurity posture and/or resilience. Examples of using layer-specific model logic to generate layer-specific responses are discussed in further detail with reference to FIG. 2.

In some implementations, the layer-specific responses can include alerts, notifications, risk assessments, and/or recommended mitigation strategies tailored to the specific context addressed by each layer. For example, a layer specializing in network traffic analysis can generate a response highlighting anomalous patterns indicative of a potential distributed denial-of-service (DDOS) attack, along with recommendations for implementing traffic filtering measures or deploying intrusion prevention systems (IPS) to mitigate the threat.

The layer-specific responses from all layers 106*a-n* are aggregated to produce an overall response 108. The overall response 108 includes the collective decisions generated by the AI model, synthesized from the individual contributions of each layer 106*a-n*. The overall response provides a holistic perspective of the layers 106*a-n* on the command set 102. Methods of aggregating the layer-specific responses from all layers 106*a-n* are discussed in further detail with reference to FIG. 2.

Figure 2:
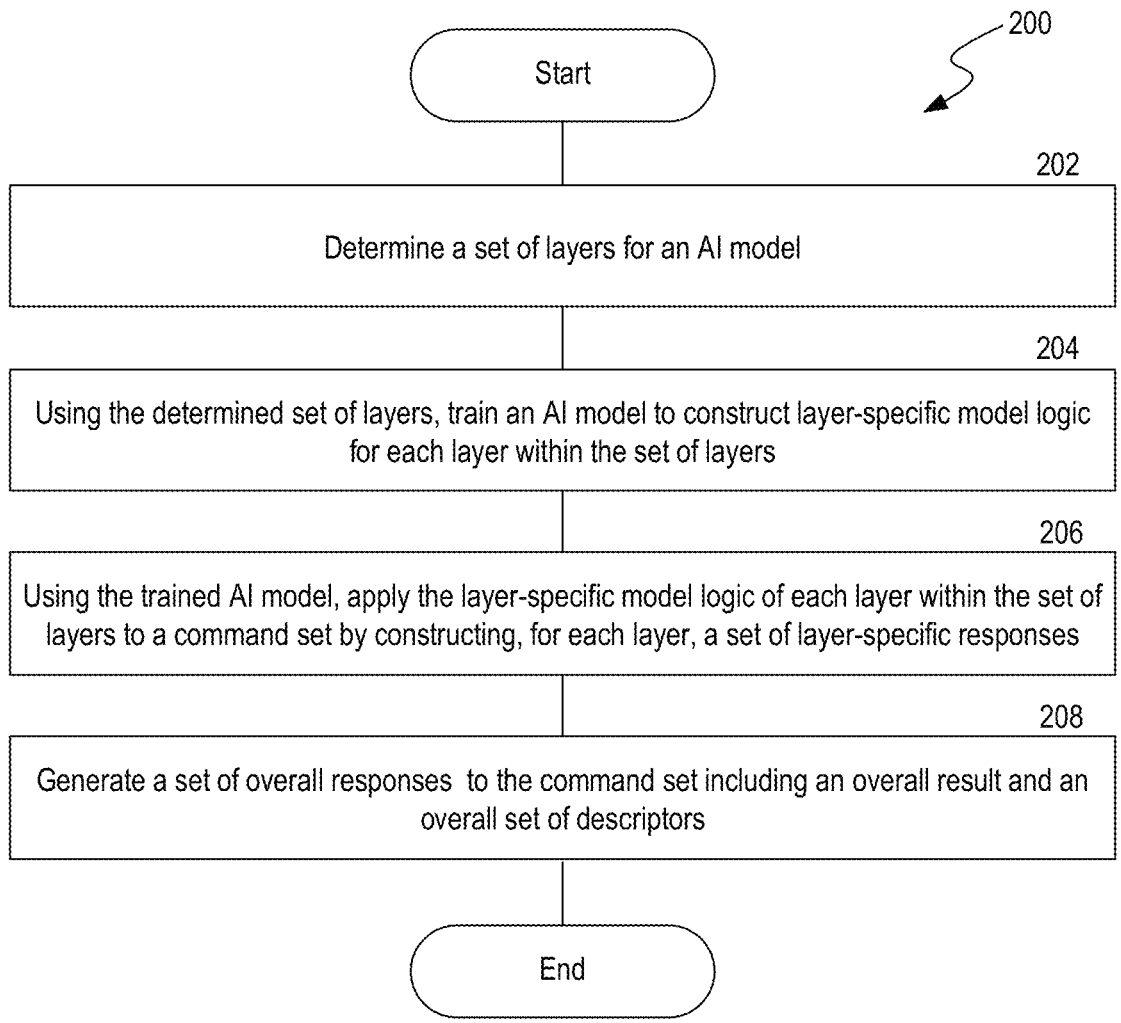
FIG. 2 is a flow diagram illustrating a process of constructing a layered AI model, in accordance with some implementations of the present technology.

FIG. 2 is a flow diagram illustrating a process 200 of constructing a layered AI model, in accordance with some implementations of the present technology. In some implementations, the process 200 is performed by components of example computer system 700 illustrated and described in more detail with reference to FIG. 7. Particular entities, for example, AI model 104, are illustrated and described in more detail with reference to FIG. 1. Likewise, implementations can include different and/or additional steps or can perform the steps in different orders.

At act 202, the system determines a set of layers for an AI model. Each layer within the set of layers relates to a specific context associated with the AI model (e.g., cybersecurity, finance, healthcare). The layers are the same as or similar to layers 106*a-n* illustrated and described with reference to FIG. 1.

Contexts within each layer of the AI model can be stored as vectors (e.g., described further with reference to FIG. 5) and/or structured data, to allow the layers to be reused and easily explained. Each layer's context can include metadata detailing its purpose, including a date/time stamp, version number, and other relevant information. This metadata allows for transparency and traceability, facilitating easier audits and updates. Additionally, the context can store necessary data elements, such as Shapley values, used by the system to understand the contributions of different inputs to the layer's decisions. The context can also include the layer's mathematical functions, such as weights, biases, and activation functions, to provide an indicator of the layer-specific model logic employed. In some implementations, the context associated with the AI model is the combined contexts of these individual layers processed through a mathematical function.

In some implementations, contexts can be derived from various sources such as the Common Vulnerabilities and Exposures (CVE) database (in the context of cybersecurity), inputted data, a knowledge base, and structured data formats. Additionally, historical data such as data on previous attacks (in the context of cybersecurity), and stored contexts from earlier analyses can be used to determine the context of an AI model. Contexts can also be retrieved using vector grouping, which allows for the clustering and identifying relevant patterns and relationships within the data used in the AI model. Vector grouping, also known as clustering, aims to group similar data points based on their proximity or similarity in the multidimensional space. By clustering data points that share common characteristics or exhibit similar patterns, vector grouping helps identify meaningful relationships and patterns within the data and enables the AI model to recognize distinct contexts or themes present in the data. For example, vector grouping could identify clusters of data points representing different types of cyber threats, attack vectors, or user behaviors and infer that cybersecurity is a context for the AI model.

Each layer within the set of layers includes a set of variables associated with the specific context of the corresponding layer. Each variable represents an attribute identified within the specific context of the corresponding layer. Variables can take various forms depending on the nature of the data and the objectives of the AI model. For example, variables can represent numerical values, categorical attributes, textual information, and/or data structures. In a predictive modeling task, variables can include demographic attributes such as age, gender, and income level, as well as behavioral attributes such as purchasing history and online activity. In a natural language processing (NLP) task, variables can include words, phrases, or sentences extracted from text data, along with associated linguistic features such as part-of-speech tags and sentiment scores. For example, in a layer whose domain context relates to analyzing anomalies in network traffic, variables can include source IP address, destination IP address, packet size, and/or port number.

In some implementations, variables can be text, image, audio, video and/or other computer-ingestible format. For variables that are not text (e.g., image, audio, and/or video), the variables can first be transformed into a universal format such as text prior to processing. Optical character recognition (OCR) can be used for images containing text, and speech-to-text algorithms can be used for audio inputs. The text can then be analyzed and structured into variables for the corresponding layer(s) of the AI model to use. In some implementations, in cases where transforming to text is not feasible or desirable, the system can use vector comparisons to handle non-text variables directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

Furthermore, the layers and/or variables within the layers can be tailored specifically to the domain of the AI model, or be used universally. For example, tailored layers in a cybersecurity AI model can include network traffic anomalies, user authentication, and threat intelligence, each providing insights into potential security threats and vulnerabilities. Alternatively, universal layers that can be applied to AI models regardless of the AI model's context could be used to analyze bias and data quality.

In some implementations, the set of layers is determined by a received input (e.g., through an interface by a user). The received input can indicate the specific contexts associated with the AI model. In some implementations, the set of layers and/or variables are dynamically determined by an ML model. The ML model can identify the specific contexts associated with the AI model. Layers and/or variables within AI models can include features generated through data transformation or feature engineering techniques. The derived layers and/or variables can capture relationships or patterns within the data that are not directly observable in the raw input or structured metadata of the input. For example, the ML model can receive the AI model's input training data. Using the gathered data, the ML model captures relationships or patterns within the data, and flags the relationships or patterns as potential layers or variables. Clustering algorithms can be applied to identify patterns and distinct subgroups (e.g., contexts) within the dataset. Further methods of training an ML model are discussed in further detail with reference to FIG. 4.

For example, the ML model analyzes the data to and identifies a context of the AI model to be overall related to customer satisfaction by recognizing the data to indicate the level of satisfaction, and further identifies potential layers to determine customer satisfaction, such as sentiment polarity, intensity, or topic relevance. The ML model can additionally determine variables for corresponding layers by identifying frequent words or phrases associated with positive or negative sentiments, as well as syntactic structures that convey sentiment.

In some implementations, the system receives an indicator of a type of application associated with the AI model. This indicator serves as a signal or cue that informs the system about the specific domain or context in which the AI model will be deployed. The indicator can take various forms, such as a user-defined parameter, a metadata tag, or a configuration setting, depending on the implementation. Upon receiving the indicator, the system proceeds to identify a relevant set of layers associated with the type of application defining one or more operation boundaries of the AI model. For example, the system can map the indicator to a predefined set of layers that are relevant in addressing the requirements and objectives of the identified application type. The identification process can be based on predefined mappings or rules.

In some implementations, instead of relying on automated mapping or inference based on the application type indicator, users can manually select and specify the desired layers for the AI model. This manual configuration process provides users with greater flexibility and control over the composition and customization of the AI model, allowing them to tailor it to their specific preferences. Once identified, the system can obtain the relevant set of layers, via an Application Programming Interface (API).

In some implementations, the system receives an input containing an overall set of layers and an overall set of variables for each layer. Using an ML model, the system compares the specific contexts within the overall set of layers with the specific contexts related to the AI model. The system extracts the AI model-specific set of layers from the overall set of layers using the comparison. For example, an ML algorithm can evaluate historical data, user feedback, or performance metrics to identify and adapt the set of layers based on observed patterns or trends. Relevant features or attributes can be extracted from the AI model's input data to capture patterns or signals indicative of the effectiveness of different layers. Feature extraction techniques can include statistical analysis, dimensionality reduction, or domain-specific methods tailored to the characteristics of the data. ML models used in determining the relevant layers and variables using the overall set of layers and variables can include supervised learning models, unsupervised learning models, semi-supervised learning models, and/or reinforcement learning models. Examples of machine learning models suitable for use with the present technology are discussed in further detail with reference to FIG. 3.

If the ML model is provided with labeled data as the training data and given an overall context (e.g., cybersecurity), the ML model can, in some implementations, filter the attributes within the training data of the AI model and identify the most informative attributes (e.g., certain patterns). For example, attributes such as time stamps and user IDs may be more informative in the cybersecurity context than attributes such as pet ownership status. Correlation, mutual information, and/or significance tests can be used to rank the attributes based on the discriminatory power. Correlation analysis measures the strength and direction of the linear relationship between each attribute and the target variable (in this case, the presence of a layer). Attributes with higher correlation coefficients are considered more relevant for detecting a layer. For example, a correlation coefficient of +1 or greater indicates a strong positive linear relationship. Mutual information estimation quantifies the amount of information shared between each attribute and the target variable, identifying attributes with higher mutual information as more informative for layer detection. Once the attributes are ranked based on discriminatory power, the system selects only the most informative features to reduce the dimensionality of the dataset. By selecting only the most informative features, filter methods help reduce the dimensionality of the dataset (e.g., by only including layers and variables that are determinative of the AI model's prediction), leading to faster processing times and improved model performance.

If the ML model is provided with unlabeled data, the ML model can use unsupervised learning techniques to identify patterns and structures within the training data. For example, clustering algorithms, which group similar instances based on shared characteristics, can be used to identify clusters of text passages that exhibit similar patterns of a potential layer. Clustering algorithms such as k-means or hierarchical clustering can be applied to the unlabeled text data to group instances that share common attributes or features. The algorithms partition the data into clusters such that instances within the same cluster are more similar to each other than to instances in other clusters. By examining the contents of each cluster, the ML model can identify patterns indicative of a domain context, such as the frequent occurrence of certain words or phrases. Additionally, topic modeling, which identifies underlying themes or topics present in the text data can be used by the ML model to automatically identify topics within a corpus of text documents (e.g., if the regulations or guidelines that the AI model is subject to are given as a corpus of text documents). Each topic represents a distribution over words, and the data is assumed to be generated from a mixture of the topics. By analyzing the topics inferred from the unlabeled data, the ML model can gain insights into the underlying themes or subjects that can be associated with a particular domain context.

For example, one or more of the layers within the set of layers can relate to the quality of input data. The corresponding set of variables can be defined to capture relevant attributes or features associated with the quality of input data. These variables serve as indicators or metrics that inform the AI model about the characteristics of the input data and its suitability for analysis. Examples of quality-related variables can include the author associated with the input data, the timestamp indicating when the data was collected or modified, the location from which the data originated, the presence or absence of structured metadata, and/or the presence of outliers or anomalies in the data distribution. In some implementations, the system establishes criteria or thresholds for identifying outliers or anomalies through predetermined rules. For example, in a dataset input to the AI model that includes a series of temperature readings collected from various weather stations over a period of time, if most of the temperature readings fall within a range of 15 to 25 degrees Celsius, a reading of 50 degrees Celsius, which is significantly higher than the usual range, can be considered an outlier because the data deviates substantially from the expected pattern of temperature readings in the dataset. In another example, if entries in the input dataset are consistently missing metadata, the data quality layer can identify and flag the instances and, for example, return an output stating that the user should provide a better quality dataset, or that the output given has a low confidence score due to the poor quality of the dataset.

In a further example, one or more of the layers within the set of layers can relate to attempts to access data. These layers analyze access events and identify patterns or anomalies indicative of potential security breaches or unauthorized access attempts. For example, a layer can focus on analyzing login attempts to a system or application, while another layer can monitor API calls or file access events. Examples of access-related variables can include the author associated with the access attempt (e.g., user ID or IP address), the timestamp indicating when the attempt occurred, the location from which the attempt originated, the presence of authorization or permissions granted for the attempt, information about previous unsuccessful attempts, and/or the frequency of access attempts over a specific time period.

In some implementations, the AI model can be constructed to identify new layer(s) within the command set. For example, ML algorithms can be applied to analyze historical command data and identify recurring themes or topics that warrant the creation of new layers. The ML algorithms can use clustering or topic modeling to identify recurring themes or patterns within the command data. For example, the ML algorithms can detect frequent commands related to user authentication, data access, or system configuration changes. The system can iteratively update the set of layers by adding the new layer(s) to the set of layers. For instance, if the ML algorithm reveals a pattern of commands related to user access control, the system can create a new layer dedicated to user authentication and authorization processes.

In act 204, using the determined set of layers, the system trains an AI model to construct layer-specific model logic for each layer within the set of layers. The layer-specific model logic generates, in response to an input, a layer-specific result using the corresponding set of variables of the layer. In some implementations, each layer-specific model logic is constructed by training the AI model on a master dataset, which includes the corresponding set of variables of each layer. For example, the layer-specific model logic can be an algebraic equation that aggregates the variables within the layer to generate a layer-specific response (e.g., "Variable_1+2 (Variable_2)+0.5 (Variable_3)=Layer-Specific_Response").

In some implementations, to construct the layer-specific model logic for each layer, the system can transform the layers of AI model using a rule-based engine. For example, the system can project/map the layers and/or variables of the AI model onto parameters that can operate within an AI model. Each layer-specific model logic in an AI model performs specific computations that contribute to the overall decision-making process. The rule-based engine maps each layer to a particular set of computations. For example, the rule-based engine can map a layer's task of identifying part-of-speech tags in text to specific neural network weights that are responsible for recognizing syntactic patterns. Similarly, a layer focused on sentiment analysis can be mapped to parameters that detect positive or negative word usage based on historical data.

In some implementations, the training data is labeled data. For example, a labeled dataset for detecting unauthorized attempts can include words or phrases labeled as either "authorized" or "non-authorized" based on whether a user was unauthorized. In some implementations, the training data is unlabeled data. Unlabeled data lacks explicit annotations and requires the model to infer patterns and structures independently. For example, unlabeled data can include the metadata associated with the attempt (e.g., timestamps, author), but without explicit annotations indicating which attempts are authorized or unauthorized.

For data privacy reasons, synthetic data can be generated and used as the training dataset for different layers within the layered AI model, either as a master dataset that all the layers are trained on, or the dataset that one or more layers are trained on. Generative adversarial networks (GANs), which consist of two neural networks—a generator and a discriminator—can be trained iteratively to generate realistic-looking data samples. For example, the generator network creates synthetic data samples from random noise or latent vectors. The generated samples are fed into the discriminator network, along with real data samples from the training dataset. The discriminator distinguishes between real and synthetic data samples. As the training progresses, both networks (the generator and the discriminator) engage in a competitive process where the generator aims to produce increasingly realistic samples, while the discriminator becomes more adept at distinguishing between real and synthetic data. Through the iterative process, the generator network learns to generate synthetic data that closely matches the statistical properties and distribution of the real data. This enables the creation of synthetic data samples that exhibit similar patterns, features, and characteristics as the original dataset, without directly exposing sensitive information or violating privacy constraints. The system constructs one or more layer-specific model logics of the AI model using the synthetic data.

In some implementations, the layer-specific model logic constructed by the AI model is generated based on a complexity of the set of variables derived from the specific context of the layer. Complexity can be determined by various factors, such as the number of distinct values, the range of possible values, or the degree of uncertainty associated with the variable. For example, a variable representing the presence of a specific threat indicator can be considered less complex than a variable representing the statistical distribution of network traffic patterns. The AI model analyzes the set of variables within each layer to determine their relative complexity. After determining the complexity of the layer, the layer-specific model logic evaluates each variable in sequence. For example, subsequently used variables in the layer-specific model logic can be progressively more complex than preceding variables. This way, the AI model can prioritize simpler variables before evaluating more complex variables to conserve computing resources. For example, if a threshold condition needed to evaluate more complex variables are not met, the layer-specific model logic does not need to evaluate the more complex variables since those variables would not be determinative of the layer-specific outcome.

In some implementations, the number of layers used in constructing the AI model is determined based on computational complexity, which is associated with time (e.g., sequence length, dimensionality) and space (e.g., number of parameters, memory required, number of layers). Sequence length refers to the length of input or output sequences processed by the AI model. Longer sequences require more computation, as each token or word in the sequence must be processed and contextualized within the entire sequence. A longer sequence can increase the complexity of computation due to the longer time required for training and inference. Dimensionality refers to the size of the input and output vectors, representing the data processed by the AI model. Higher dimensionality means each data point is represented with more features, increasing the complexity of the computations the AI model performs. The number of parameters refers to the total count of weights and biases in the model, which impacts the model's ability to learn and generalize from data. Greater parameters can mean more complex and potentially more accurate models, but greater parameters also require increased memory and computational resources to manage. Memory required includes the amount of RAM or other memory resources needed to store the model parameters and intermediate computation results during training and inference. As the AI model size grows, so does the memory requirement, which can be a limiting factor in deploying large models on hardware with limited resources.

The number of layers in an AI model affects both time and space complexity. Each layer adds additional computation and storage requirements, as the data must pass through multiple transformations and computations from input to output. More layers generally allow the model to capture more complex patterns and dependencies in the data, but more layers also increase the overall computational load and memory usage.

In act 206, using the trained AI model, the system applies the layer-specific model logic of each layer within the set of layers on a command set. The system passes the command set (e.g., command set 102) through the AI model, where each layer processes the command set independently using the layer's specific set of variables and learned parameters. The layer-specific model logic determines how the AI model interprets and responds to the command set within the context of each layer.

In some implementations, the output of one layer can operate as an input for subsequent layers to allow the AI model to leverage the insights and decisions generated at each layer to inform subsequent steps. For example, one layer can focus on data quality and output flagged instances of unusual activity (e.g., anomalous timestamp or location), and the system can pass the output to a subsequent layer directed to anomaly detection. The flagged instances from the data quality layer can be input into the anomaly detection layer, where more complex algorithms can be used to further evaluate the flagged data points in greater detail to search for deviations from normal behavior that may signify a security threat. The output of this layer may consist of, for example, risk scores assigned to each flagged instance, providing a deeper level of insight into potential security breaches.

The system generates, for each layer, a set of layer-specific responses that can include (1) the layer-specific result in accordance with the application of the layer-specific model logic of each layer within the set of layers, and/or (2) a layer-specific set of descriptors indicating the corresponding layer-specific model logic to generate the layer-specific result. The layer-specific result represents the output or prediction generated by the AI model within the domain or context defined by the specific layer. The layer-specific set of descriptors provides transparency and interpretability in the decision-making process of the AI model. The layer-specific descriptors can include information about the variables, algorithms, or methodologies employed within each layer to arrive at the layer-specific result. For example, in the context of a command set aimed at determining whether an access attempt was authorized, the layer-specific result can be "non-authorized." Correspondingly, the layer-specific set of descriptors can be "incorrect password," which explains why the user was classified as non-authorized. In some implementations, in response to reaching a non-compliance threshold, the system is prevented from generating additional sets of layer-specific responses.

In act 208, the system generates a set of overall responses to the command set including an overall result and an overall set of descriptors. The overall result for each layer can include a binary indicator of one or more variables in corresponding set of variables, a category of the layer-specific response, and/or a probability of the layer-specific response. The overall set of descriptors is associated with a series of the layer-specific set of descriptors to generate the overall result. The overall set of descriptors can indicate the set of layers, the corresponding sets of variables, and/or the weights used for each layer.

To generate the overall result, the system aggregates the layer-specific results from each layer using weights for each layer. In some implementations, the weights are manually defined and predetermined by users. In some implementations, the system uses ML algorithms to determine the weights for each layer. For example, the system can analyze historical data to identify the most effective weightings that maximize the accuracy or reliability of the AI model's predictions. The system can use techniques such as gradient descent, genetic algorithms, or Bayesian optimization to search for the most effective weightings. Gradient descent iteratively adjusts the weights of the layers to minimize a loss function, which measures the difference between the predicted outputs and the actual targets in the training data. By computing the gradient of the loss function with respect to the weights, gradient descent determines the direction and magnitude of weight updates that reduce the loss, gradually converging towards a more effective set of weights. Additionally, Bayesian optimization iteratively selects candidate points in the weight space to evaluate, and balances exploration (searching for promising regions) and exploitation (exploiting regions with high predicted performance). Through this process, Bayesian optimization efficiently converges towards the optimal set of weights by sampling the weight space.

In some implementations, the weights can be determined through confidence scores of each layer-specific response. The system generates confidence scores, via the AI model, for the corresponding layer-specific response. The confidence scores represent a reliability of the layer-specific response, and the system dynamically switches between one or more layers within the set of layers based on the generated confidence scores. For example, layers with higher confidence scores in its layer-specific response are weighted more than layers with lower confidence scores in its layer-specific response.

Once the layer-specific results and their corresponding weights are determined, the system proceeds to aggregate the layer-specific results into an overall result to the command set. The aggregation process can involve mathematical operations such as weighted averaging, summation, or techniques tailored to the specific requirements of the AI model and its application domain. For example, a mathematical function aggregating the layer-specific results can include the layer's bias, weights for particular layer-specific results, and/or other functions used by the layers for the layer-specific results.

Using the generated overall result, the system aggregates the layer-specific set of descriptors that are associated with the set(s) of descriptors used to generate the overall result. In some implementations, only the sets of descriptors that support this overall result are included in the overall set of descriptors. For example, if the overall result is binary (e.g., "AUTHORIZED"), only the descriptors for the layers which support this result (e.g., non-suspicious frequency or location) are included in the overall set of descriptors. Alternatively, all of the sets of descriptors for all of the layers used in the prediction are included in the overall set of descriptors.

Based on the aggregation, the system generates a set of overall responses to the command set including an overall result and an overall set of descriptors. The overall set of descriptors is associated with a series of the layer-specific set of descriptors to generate the overall result. The overall set of descriptors can indicate the set of layers, the corresponding sets of variables, and/or the predetermined weights used for each layer. The overall result for each layer can include a binary indicator of one or more variables in corresponding set of variables, a category of the layer-specific response, and/or a probability of the layer-specific response.

In some implementations, the system uses the overall responses, to generate a set of actions (e.g., recommendations, corrective actions) to adjust the overall result to a desired result. The actions aim to address any identified issues or deficiencies. For example, if certain layers fail to meet the desired criteria due to specific attribute values or patterns, the actions can suggest adjustments to those attributes or modifications to the underlying processes. For example, a suggested action can be to weigh certain layers differently if new regulations or guidelines are given to the AI model.

The system can use an ML model to learn from historical data and past decisions to identify patterns and trends that indicate a set of actions the AI model can take to comply with to adjust the overall result to the desired result. By training on a dataset of past corrective actions and the outcomes, the machine learning models can predict the most effective recommendations for new cases. The set of actions can be automatically implemented as corrective actions by the system. For example, the system can receive user feedback related to deviations between the overall response of the AI model and desired response (e.g., feedback to stop using a certain layer/variable, or to add a new layer/variable). The system can iteratively adjust the set of layers and/or the layer-specific model logic to modify the overall response to the desired response. In some implementations, the system can tag relevant recommendations with attributes that help contextualize the relevant recommendations. The tags serve as markers that categorize and organize the recommendations based on predefined criteria, such as regulatory compliance and cybersecurity. The tags provide a structured representation of the recommendations and allow for easier retrieval, manipulation, and analysis of future command sets. The tags and associated metadata can be stored in a structured format, such as a database, where each recommendation is linked to the recommendation's corresponding tags.

For example, to construct a layered AI model, the system can first assess both the current and target requirements or guidelines (e.g., jurisdictional, organizational, AI-type specific). In a cybersecurity context, the system can identify existing cybersecurity protocols, frameworks, and technologies in use, alongside defining the desired cybersecurity posture aligned with organizational goals, regulatory standards, and industry best practices. The system can identify any gaps or deficiencies between the current and target requirements or guidelines. For example, in a cybersecurity context, gaps can encompass areas such as network security, data protection measures, access controls, and/or incident response protocols. Once the system understands the gaps, the system can prioritize the layers used within the AI model (e.g., by adjusting the weights of particular layers, by omitting or including certain layers). For example, layers can be ranked using mathematical functions based on their relevance to the organization's mission, legal and regulatory requirements, and/or risk management expectations. Moreover, the system can continuously monitor and track progress toward addressing the identified gaps to adjust the layers (e.g., by adjusting the weights of particular layers, by omitting or including certain layers) to reduce the identified gaps. For example, a mathematical function ranking the layers can include the bias for the layer, weights for particular layers, and other functions used by the layered AI model for the layer.

In some implementations, the gap can be identified using a machine learning model trained on labeled training data to learn patterns and relationships between features and guideline sources. For example, the labeled training data can be sets of guidelines based on the type of guideline they belong to (e.g., current guideline, target guideline). Using the trained model, the system can use the trained model to identify differences between the sets of guidelines by analyzing the features that contribute most to the classification decision (e.g., current guideline, target guideline) of each set of guidelines and identifying areas of divergence or overlap between the guidelines.

In some implementations, the system presents, via an interface (e.g., a graphical user interface (GUI)), human-readable summaries and/or detailed technical reports associated with the layered AI model. For example, the human-readable summaries can use AI-generated boilerplate text to indicate which layers and variables most significantly influenced the overall outcome to provide clear and concise explanations suitable for non-technical stakeholders. On the other hand, the detailed technical reports can include formulas and computational steps used in constructing the layered AI model, or a subset thereof if desired to offer in-depth insights into the model's workings for individuals such as technical users who desire a comprehensive understanding of the AI model's decision-making process.

Figure 3:
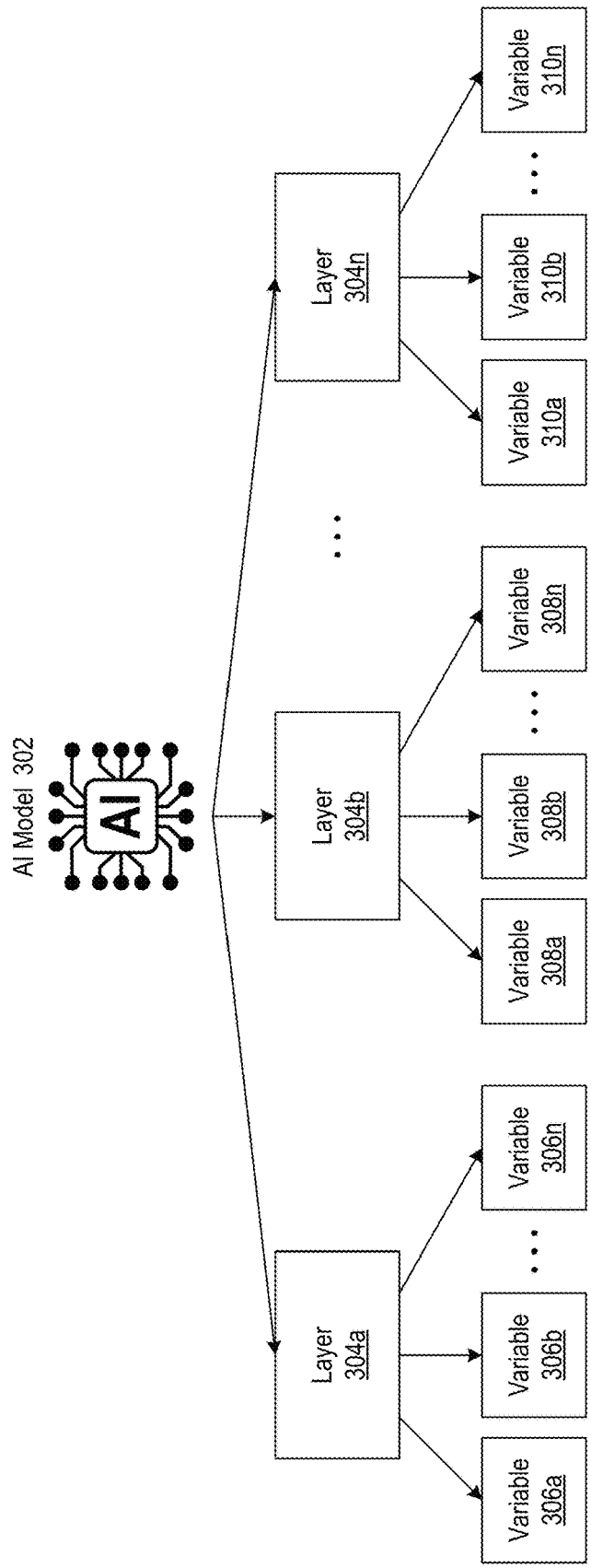
FIG. 3 is an illustrative diagram illustrating an example environment of variables within the layers of an AI model.

FIG. 3 is an illustrative diagram illustrating an example environment 300 of variables within the layers of an AI model. Environment 300 includes AI model 302, layers 304a-n, and variables 306a-n, 308a-n, 310a-n for each layer 304a-n. AI model 302 is the same as or similar to AI model 104 illustrated and described in more detail with reference to FIGS. 1, respectively. Layers 304a-n are the same as or similar to layers 306a-n illustrated and described in more detail with reference to FIG. 1. AI model 302 is implemented using components of example computer system 700 illustrated and described in more detail with reference to FIG. 7, respectively. Likewise, implementations of example environment 300 can include different and/or additional components or can be connected in different ways.

Within each layer 304a-n, a set of variables 306a-n, 308a-n, 310a-n are defined to capture the key attributes and features associated with the respective domain of the corresponding layer 304a-n. For example, variables 306a-n correspond to layer 304a, variables 308a-n correspond to layer 304b, and variables 310a-n correspond to layer 304c. Each variable represents a parameter that contributes to the layer's analysis and decision-making process (e.g., layer-specific model logic). The variables 306a-n, 308a-n, 310a-n within each layer 304a-n can be organized and structured according to the variables' 306a-n, 308a-n, 310a-n relevance and importance to the corresponding layer's specific objectives. For example, variables associated with demographic information can include age, gender, and income level, while variables related to financial data can encompass account balances, transaction history, and credit scores.

Machine learning techniques can be applied to identify patterns or clusters within the layers and automatically categorize the layers into relevant variables based on similarity or relevance. Clustering algorithms, such as k-means or hierarchical clustering, can be used to identify variables based on the layer's content or features by partitioning the data underlying the layer into clusters, where the content within each cluster is more similar to each other than the content in different clusters. After clustering the content within a layer, the system can assign each cluster to a relevant variable based on the cluster's content or theme. For example, if a cluster predominantly discusses gender, the cluster is assigned to a variable related to gender. Further methods of identifying variables within a layer are discussed with reference to FIG. 2.

In some implementations, deep learning techniques (e.g., recurrent neural networks (RNNs)) are used to learn latent representations of the layer and automatically cluster the layer based on learned representations. In some implementations, ensemble learning techniques, such as Random Forests or Gradient Boosting Machines (GBMs), are used to combine multiple clustering algorithms or models to improve the accuracy of the clustering process by aggregating the predictions of multiple base models to produce a final clustering solution, which can be more reliable than individual models alone.

Figure 4:
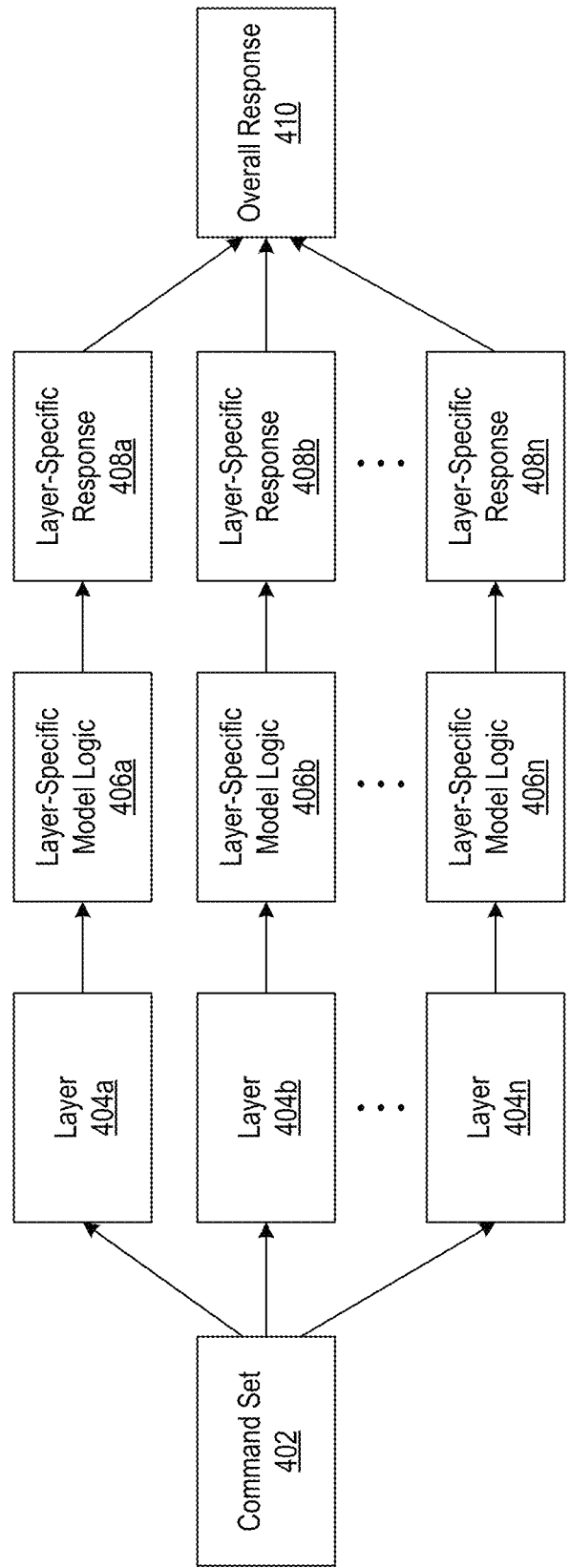
FIG. 4 is an illustrative diagram illustrating an example environment for generating an overall response for a received command set using a layered AI model.

FIG. 4 is an illustrative diagram illustrating an example environment 400 for generating an overall response for a received command set using a layered AI model. Environment 400 includes command set 402, layers 404a-n, layer-specific model logic 406a-n, layer-specific responses 408a-n, and overall response 410. Layers 404a-n are the same as or similar to layers 106a-n and layers 304a-n illustrated and described in more detail with reference to FIG. 1 and FIG. 3, respectively. Command set 402 is the same as or similar to command set 102 illustrated and described in more detail with reference to FIG. 1. Overall response 410 is the same as or similar to overall response 108 illustrated and described in more detail with reference to FIG. 1. Likewise, implementations of example environment 400 can include different and/or additional components or can be connected in different ways.

The command set 402 includes a set of instructions or queries directed towards the AI model. Further examples of a command set 102 are discussed with reference to FIG. 1. Multiple layers 404*a-n* can constitute the hierarchical structure or algorithm of the AI model in processing the command set 402. Within each layer 404*a-n*, layer-specific model logic 406*a-n* is defined to govern the processing of input data (e.g., command set 402) and generate layer-specific responses 408*a-n*. The layer-specific model logic 406*a-n* illustrates the algorithms and rules employed by each layer 404*a-n* to interpret and analyze the command set 402.

As the command set 402 traverses through each layer 404*a-n*, the layer-specific model logic 406*a-n* of each layer 1403*a-n* is applied to generate layer-specific responses 408*a-n*. The layer-specific responses 408*a-n* represent the individual contributions of each layer to the overall analysis, capturing the insights and decisions derived from the layer-specific processing. Methods of generating layer-specific responses using layer-specific model logic are further described in FIG. 3. The layer-specific responses 408*a-n* from all layers 404*a-n* can be aggregated to produce an overall response 410, which is a synthesized version of the collective insights and decisions generated by the different layers 404*a-n*. Methods of aggregating the layer-specific responses 408*a-n* from all layers 404*a-n* are further described in FIG. 2.

Figure 5:
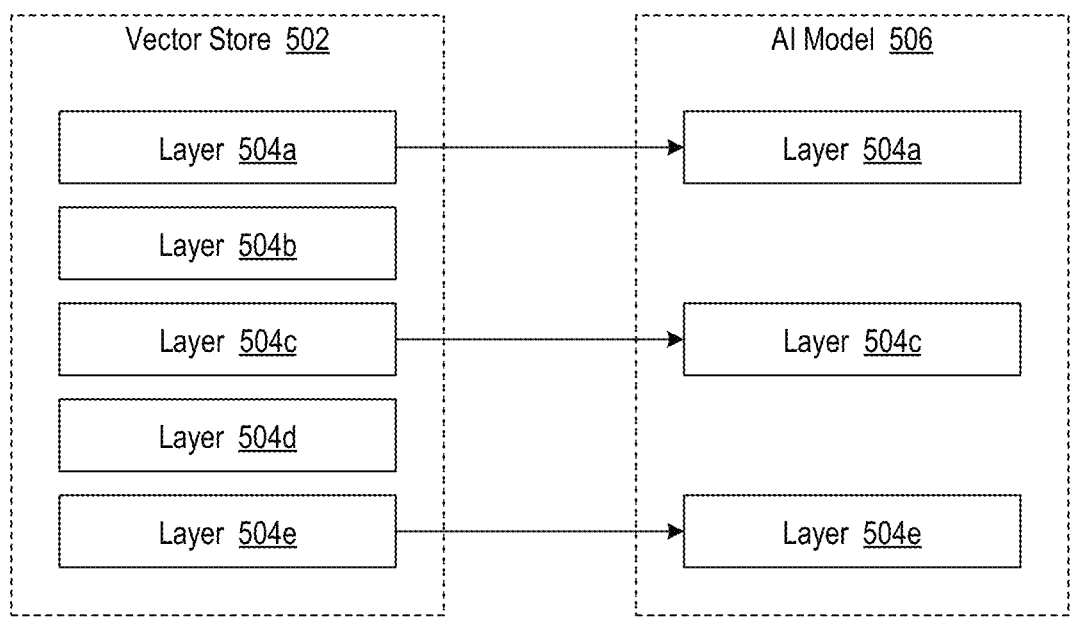
FIG. 5 is an illustrative diagram illustrating an example environment for constructing a layered AI model with layers from a vector store.

FIG. 5 is an illustrative diagram illustrating an example environment 500 for constructing a layered AI model with layers from a vector store. Environment 500 includes vector store 502, layers 504*a-n* within vector store 502, and AI model 506. AI model 506 is the same as or similar to AI model 104 and AI model 302 illustrated and described in more detail with reference to FIG. 1 and FIG. 3, respectively. Layers 504*a-n* are the same as or similar to layers 106*a-n*, layers 304*a-n*, and layers 404*a-n* illustrated and described in more detail with reference to FIG. 1, FIG. 3, and FIG. 4, respectively. AI model 506 is implemented using components of example computer system 700 illustrated and described in more detail with reference to FIG. 7. Likewise, implementations of example environment 500 can include different and/or additional components or can be connected in different ways.

The vector store 502 is a repository for pre-existing layers that can be used in the construction of the AI model. The vector store 502 stores the layers 504*a-n* in a structured and accessible format (e.g., using distributed databases or NoSQL stores), which allows for efficient retrieval and utilization by the AI model 506. Contained within the vector store are multiple layers 504*a-n*. The layers 504*a-n* are stored in a structured manner within the vector store 502, with each layer 504*a-n* including algorithms and/or data relevant to specific domains or aspects of the decision-making process. In some implementations, only select layers from the vector store are used in the AI model 506. For example, in FIG. 5, only layers 504*a*, 504*c*, and 504*e* are selected to be included in the AI model 506. The AI model 506 integrates the selected layers 504*a*, 504*c*, and 504*e* from the vector store 502. By using layers from a vector store 502, constructing the AI model 506 becomes more streamlined, as it eliminates the need to develop or train new layers from scratch. Rather, existing layers that have been pre-designed and/or validated (e.g., adhering to regulations or guidelines) can be readily incorporated into the AI model, accelerating the development process.

In some implementations, the layers 504*a-n* are preprocessed to remove any irrelevant information, standardize the format, and/or organize the layers 504*a-n* into a structured database schema. Once the layers 504*a-n* are prepared, the layers 504*a-n* can be stored in a vector store 502 using distributed databases or NoSQL stores.

In some implementations, the layers 504*a-n* are stored using graph databases such as Neo4j™ or Amazon Neptune™. Graph databases represent data as nodes and edges, allowing for the modeling of relationships between layers 504*a-n* to demonstrate the interdependencies. In some implementations, the layers 504*a-n* are stored in a distributed file system such as Apache Hadoop™ or Google Cloud Storage™. These systems offer scalable storage for large volumes of data and support parallel processing and distributed computing. Layers 504*a-n* stored in a distributed file system can be accessed and processed by multiple nodes simultaneously, which allows for faster retrieval and analysis by the validation engine.

The vector store 502 can be stored in a cloud environment hosted by a cloud provider, or a self-hosted environment. In a cloud environment, the vector store 502 has the scalability of cloud services provided by platforms (e.g., AWS™, Azure™). Storing the vector store 502 in a cloud environment entails selecting the cloud service, provisioning resources dynamically through the provider's interface or APIs, and configuring networking components for secure communication. Cloud environments allow the vector store 502 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 502 is stored on a private web server. Deploying the vector store 502 in a self-hosted environment entails setting up the server with the necessary hardware or virtual machines, installing an operating system, and storing the vector store 502. In a self-hosted environment, organizations have full control over the vector store 502, allowing organizations to implement customized security measures and compliance policies tailored to the organization's specific needs. For example, organizations in industries with strict data privacy and security regulations, such as finance institutions, can mitigate security risks by storing the vector store 502 in a self-hosted environment.

The AI model 506 accesses layers 504*a-n* from the vector store 502 to initiate the compliance assessment. The AI model 506 can establish a connection to the AI model 506 using appropriate APIs or database drivers. The connection allows the AI model 506 to query the vector store 502 and retrieve the relevant layers for the AI application under evaluation. Frequently accessed layers 504*a-n* are stored in memory, which allows the AI model 506 to reduce latency and improve response times for compliance assessment tasks.

AI System

Figure 6:
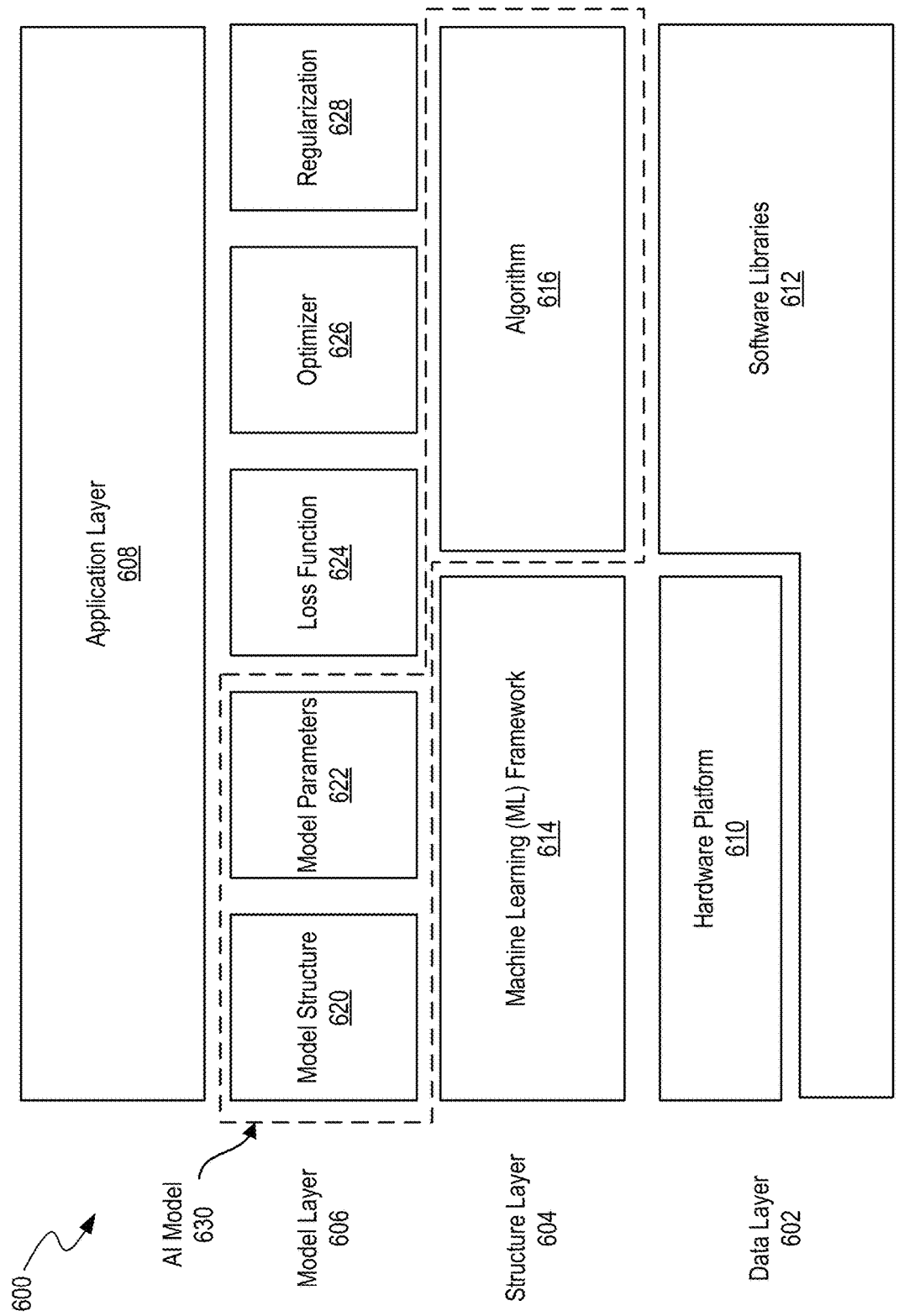
FIG. 6 is a high-level block diagram illustrating an example AI system, in accordance with one or more implementations.

FIG. 6 is a block diagram illustrating an example artificial intelligence (AI) system 600, in accordance with one or more implementations of this disclosure. The AI system 600 is implemented using components of the example computer system 700 illustrated and described in more detail with reference to FIG. 7. For example, the AI system 600 can be implemented using the processor 702 and instructions 708 programmed in the memory 706 illustrated and described in more detail with reference to FIG. 7. Likewise, implementations of the AI system 600 can include different and/or additional components or be connected in different ways.

As shown, the AI system 600 can include a set of layers, which conceptually organize elements within an example network topology for the AI system's architecture to implement a particular AI model 630. Generally, an AI model 630 is a computer-executable program implemented by the AI system 600 that analyzes data to make predictions. Information can pass through each layer of the AI system 600 to generate outputs for the AI model 630. The layers can include a data layer 602, a structure layer 604, a model layer 606, and an application layer 608. The algorithm 616 of the structure layer 604 and the model structure 620 and model parameters 622 of the model layer 606 together form the example AI model 630. The optimizer 626, loss function engine 624, and regularization engine 628 work to refine and optimize the AI model 630, and the data layer 602 provides resources and support for application of the AI model 630 by the application layer 608.

The data layer 602 acts as the foundation of the AI system 600 by preparing data for the AI model 630. As shown, the data layer 602 can include two sub-layers: a hardware platform 610 and one or more software libraries 612. The hardware platform 610 can be designed to perform operations for the AI model 630 and include computing resources for storage, memory, logic, and networking, such as the resources described in relation to FIG. 7. The hardware platform 610 can process amounts of data using one or more servers. The servers can perform backend operations such as matrix calculations, parallel calculations, machine learning (ML) training, and the like. Examples of servers used by the hardware platform 610 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 610 can include Infrastructure as a Service (IaaS) resources, which are computing resources, (e.g., servers, memory, etc.) offered by a cloud services provider. The hardware platform 610 can also include computer memory for storing data about the AI model 630, application of the AI model 630, and training data for the AI model 630. The computer memory can be a form of random-access memory (RAM), such as dynamic RAM, static RAM, and non-volatile RAM.

The software libraries 612 can be thought of as suites of data and programming code, including executables, used to control the computing resources of the hardware platform 610. The programming code can include low-level primitives (e.g., fundamental language elements) that form the foundation of one or more low-level programming languages, such that servers of the hardware platform 610 can use the low-level primitives to carry out specific operations. The low-level programming languages do not require much, if any, abstraction from a computing resource's instruction set architecture, allowing them to run quickly with a small memory footprint. Examples of software libraries 612 that can be included in the AI system 600 include Intel Math Kernel Library, Nvidia cuDNN, Eigen, and OpenBLAS.

The structure layer 604 can include a machine learning (ML) framework 614 and an algorithm 616. The ML framework 614 can be thought of as an interface, library, or tool that allows users to build and deploy the AI model 630. The ML framework 614 can include an open-source library, an application programming interface (API), a gradient-boosting library, an ensemble method, and/or a deep learning toolkit that work with the layers of the AI system facilitate development of the AI model 630. For example, the ML framework 614 can distribute processes for application or training of the AI model 630 across multiple resources in the hardware platform 610. The ML framework 614 can also include a set of pre-built components that have the functionality to implement and train the AI model 630 and allow users to use pre-built functions and classes to construct and train the AI model 630. Thus, the ML framework 614 can be used to facilitate data engineering, development, hyperparameter tuning, testing, and training for the AI model 630.

Examples of ML frameworks 614 or libraries that can be used in the AI system 600 include TensorFlow, PyTorch, Scikit-Learn, Keras, and Caffe. Random Forest is a machine learning algorithm that can be used within the ML frameworks 614. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

In some implementations, the ML framework 614 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 600. For example, the ML framework 614 can use a cascade of multiple layers of nonlinear processing units for implicit feature extraction and transformation. Each successive layer uses the output from the previous layer as input. The AI model 630 can thus learn in supervised (e.g., classification) and/or unsupervised (e.g., pattern analysis) modes. The AI model 630 can learn multiple levels of representations that correspond to different levels of abstraction, wherein the different levels form a hierarchy of concepts. In this manner, AI model 630 can be configured to differentiate features of interest from background features.

The algorithm 616 can be an organized set of computer-executable operations used to generate output data from a set of input data and can be described using pseudocode. The algorithm 616 can include complex code that allows the computing resources to learn from new input data and create new/modified outputs based on what was learned. In some implementations, the algorithm 616 can build the AI model 630 through being trained while running computing resources of the hardware platform 610. The training allows the algorithm 616 to make predictions or decisions without being explicitly programmed to do so. Once trained, the algorithm 616 can run at the computing resources as part of the AI model 630 to make predictions or decisions, improve computing resource performance, or perform tasks. The algorithm 616 can be trained using supervised learning, unsupervised learning, semi-supervised learning, and/or reinforcement learning.

Using supervised learning, the algorithm 616 can be trained to learn patterns (e.g., map input data to output data) based on labeled training data. The training data can be labeled by an external user or operator. The user can label the training data based on one or more classes and trains the AI model 630 by inputting the training data to the algorithm 616. The algorithm determines how to label the new data based on the labeled training data. The user can facilitate collection, labeling, and/or input via the ML framework 614. In some instances, the user can convert the training data to a set of feature vectors for input to the algorithm 616. Once trained, the user can test the algorithm 616 on new data to determine if the algorithm 616 is predicting accurate labels for the new data. For example, the user can use cross-validation methods to test the accuracy of the algorithm 616 and retrain the algorithm 616 on new training data if the results of the cross-validation are below an accuracy threshold.

Supervised learning can involve classification and/or regression. Classification techniques involve teaching the algorithm 616 to identify a category of new observations based on training data and are used when input data for the algorithm 616 is discrete. Said differently, when learning through classification techniques, the algorithm 616 receives training data labeled with categories (e.g., classes) and determines how features observed in the training data relate to the categories. Once trained, the algorithm 616 can categorize new data by analyzing the new data for features that map to the categories. Examples of classification techniques include boosting, decision tree learning, genetic programming, learning vector quantization, k-nearest neighbors (k-NN) algorithm, and statistical classification.

Regression techniques involve estimating relationships between independent and dependent variables and are used when input data to the algorithm 616 is continuous. Regression techniques can be used to train the algorithm 616 to predict or forecast relationships between variables. To train the algorithm 616 using regression techniques, a user can select a regression method for estimating the parameters of the model. The user collects and labels training data that is input to the algorithm 616 such that the algorithm 616 is trained to understand the relationship between data features and the dependent variable(s). Once trained, the algorithm 616 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 616 learns patterns from unlabeled training data. In particular, the algorithm 616 is trained to learn hidden patterns and insights of input data, which can be used for data exploration or for generating new data. Here, the algorithm 616 does not have a predefined output, unlike the labels output when the algorithm 616 is trained using supervised learning. Another way unsupervised learning is used to train the algorithm 616 to find an underlying structure of a set of data is to group the data according to similarities and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 616 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 616 can be trained to be an Isolation Forest, local outlier factor (LOF) algorithm, or K-nearest neighbors (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 616 include factor analysis, item response theory, latent profile analysis, and latent class analysis.

In some implementations, the AI system 600 trains the algorithm 616 of AI model 630, based on the training data, to correlate the feature vector to expected outputs in the training data. As part of the training of the AI model 630, the AI system 600 forms a training set of features and training labels by identifying a positive training set of features that have been determined to have a desired property in question, and, in some implementations, forms a negative training set of features that lack the property in question. The AI system 600 applies ML framework 614 to train the AI model 630, that when applied to the feature vector, outputs indications of whether the feature vector has an associated desired property or properties, such as a probability that the feature vector has a particular Boolean property, or an estimated value of a scalar property. The AI system 600 can further apply dimensionality reduction (e.g., via linear discriminant analysis (LDA), PCA, or the like) to reduce the amount of data in the feature vector to a smaller, more representative set of data.

The model layer 606 implements the AI model 630 using data from the data layer and the algorithm 616 and ML framework 614 from the structure layer 604, thus enabling decision-making capabilities of the AI system 600. The model layer 606 includes a model structure 620, model parameters 622, a loss function engine 624, an optimizer 626, and a regularization engine 628.

The model structure 620 describes the architecture of the AI model 630 of the AI system 600. The model structure 620 defines the complexity of the pattern/relationship that the AI model 630 expresses. Examples of structures that can be used as the model structure 620 include decision trees, support vector machines, regression analyses, Bayesian networks, Gaussian processes, genetic algorithms, and artificial neural networks (or, simply, neural networks). The model structure 620 can include a number of structure layers, a number of nodes (or neurons) at each structure layer, and activation functions of each node. Each node's activation function defines how each node converts data received to data output. The structure layers can include an input layer of nodes that receive input data, an output layer of nodes that produce output data. The model structure 620 can include one or more hidden layers of nodes between the input and output layers. The model structure 620 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 622 represent the relationships learned during training and can be used to make predictions and decisions based on input data. The model parameters 622 can weight and bias the nodes and connections of the model structure 620. For example, when the model structure 620 is a neural network, the model parameters 622 can weight and bias the nodes in each layer of the neural networks, such that the weights determine the strength of the nodes and the biases determine the thresholds for the activation functions of each node. The model parameters 622, in conjunction with the activation functions of the nodes, determine how input data is transformed into desired outputs. The model parameters 622 can be determined and/or altered during training of the algorithm 616.

The loss function engine 624 can determine a loss function, which is a metric used to evaluate the AI model's 630 performance during training. For example, the loss function engine 624 can measure the difference between a predicted output of the AI model 630 and the actual output of the AI model 630 and is used to guide optimization of the AI model 630 during training to minimize the loss function. The loss function can be presented via the ML framework 614, such that a user can determine whether to retrain or otherwise alter the algorithm 616 if the loss function is over a threshold. In some instances, the algorithm 616 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 626 adjusts the model parameters 622 to minimize the loss function during training of the algorithm 616. In other words, the optimizer 626 uses the loss function generated by the loss function engine 624 as a guide to determine what model parameters lead to the most accurate AI model 630. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 626 used can be determined based on the type of model structure 620 and the size of data and the computing resources available in the data layer 602.

The regularization engine 628 executes regularization operations. Regularization is a technique that prevents over- and under-fitting of the AI model 630. Overfitting occurs when the algorithm 616 is overly complex and too adapted to the training data, which can result in poor performance of the AI model 630. Underfitting occurs when the algorithm 616 is unable to recognize even basic patterns from the training data such that it cannot perform well on training data or on validation data. The regularization engine 628 can apply one or more regularization techniques to fit the algorithm 616 to the training data properly, which helps constraint the resulting AI model 630 and improves its ability for generalized application. Examples of regularization techniques include lasso (L1) regularization, ridge (L2) regularization, and elastic (L1 and L2 regularization).

In some implementations, the AI system 600 can include a feature extraction module implemented using components of the example computer system 700 illustrated and described in more detail with reference to FIG. 7. In some implementations, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 630 by using the reduced representation. In some example implementations, the following dimensionality reduction techniques are used by the feature extraction module: independent component analysis, Isomap, kernel principal component analysis (PCA), latent semantic analysis, partial least squares, multifactor dimensionality reduction, nonlinear dimensionality reduction, multilinear PCA, multilinear subspace learning, semidefinite embedding, autoencoder, and deep feature synthesis.

Computer System

Figure 7:
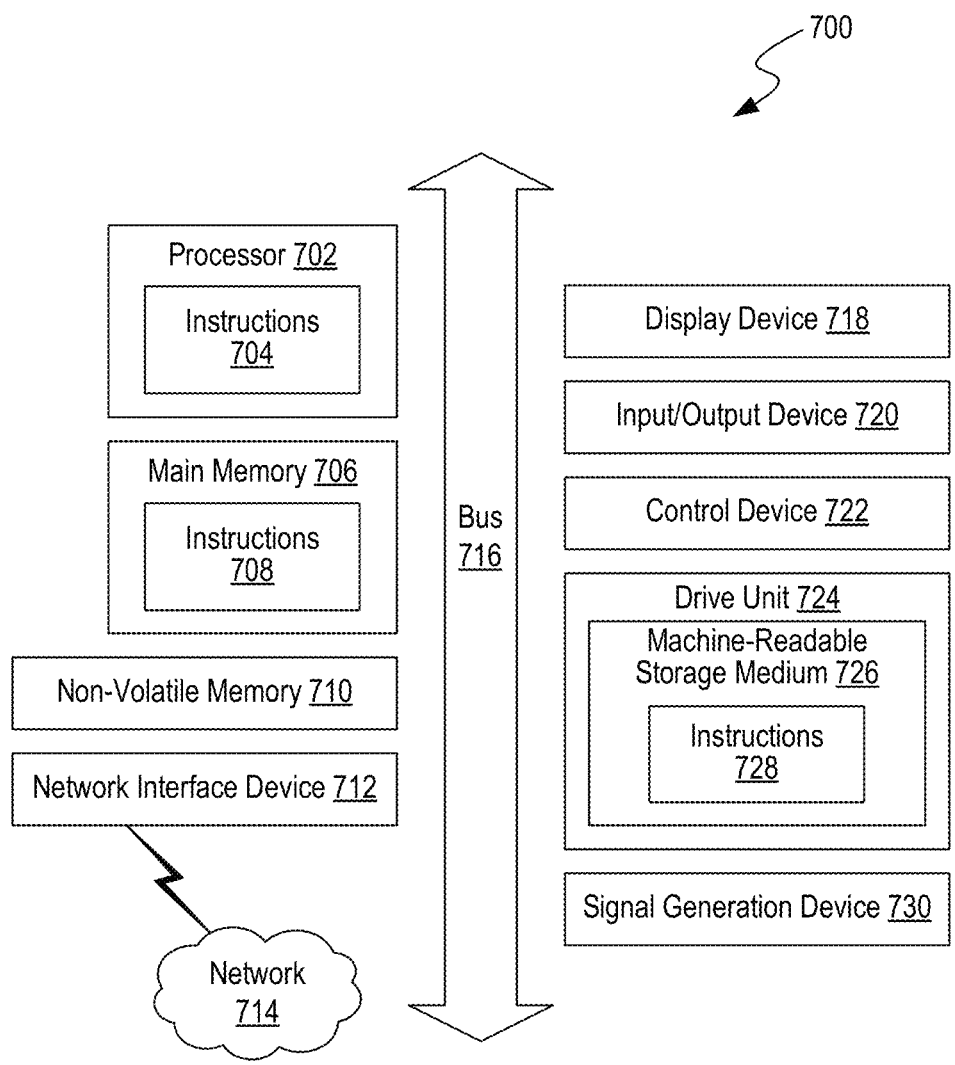
FIG. 7 is a block diagram illustrating an example computer system, in accordance with one or more implementations.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in the specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite the change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer-implemented method for generating responses using a layered artificial intelligence (AI) model, the method comprising:
   determining a set of layers for an AI model,
      wherein each layer within the set of layers relates to a specific context associated with the AI model;
   using the determined set of layers, training the AI model to construct layer-specific model logic for each layer within the set of layers,
      wherein the layer-specific model logic is configured to, in response to an input, generate an output in accordance with the specific context associated with the layer; and using the trained AI model, generating a set of overall responses to a command set including: (1) a result and (2) a set of descriptors indicating one or more layer-specific model logics to generate the result by:
applying the layer-specific model logic of one or more layers within the set of layers to the command set, wherein the command set comprises a set of instructions or queries directed toward the AI model,
generating, for the one or more layers, a set of layer-specific responses in accordance with the layer-specific model logic of each layer within the set of layers, and
aggregating the sets of layer-specific responses from the one or more layers.

2. The computer-implemented method of claim 1, further comprising:
receiving an indicator of a type of application associated with the AI model; and
identifying a relevant set of layers associated with the type of the application defining one or more operation boundaries of the AI model.

3. The computer-implemented method of claim 1, wherein the layer-specific model logic constructed by the AI model is generated using a complexity of the specific context of a corresponding layer.

4. The computer-implemented method of claim 1, wherein the set of descriptors indicates one or more of:
the set of layers,
corresponding sets of variables associated with the specific context of each layer of the set of layers, or
a set of weights used for each layer.

5. The computer-implemented method of claim 1, further comprising:
using the set of overall responses, generating a set of actions configured to adjust the result to a desired result.

6. The computer-implemented method of claim 1, wherein one or more layers within the set of layers relates to quality of input data, and
wherein the quality of input data relates to one or more of:
an author associated with the input data,
a timestamp associated with the input data,
a location associated with the input data,
a presence of structured metadata,
an absence of the structured metadata, or
outliers in the input data.

7. The computer-implemented method of claim 1, wherein one or more of the layers within the set of layers relates to an attempt to access data, and
wherein the attempts to access data relates to one or more of:
an author associated with the attempt,
a timestamp associated with the attempt,
a location associated with the attempt,
a presence of an authorization related to the attempt,
previous unsuccessful attempts to access the data, or
frequency of the attempts.

8. A system comprising:
at least one hardware processor; and
at least one non-transitory memory storing instructions, which, when executed by the at least one hardware processor, cause the system to:
determine a set of layers for an AI model,
wherein one or more layers within the set of layers relates to a specific context associated with the AI model;
using the determined set of layers, train the AI model to construct layer-specific model logic for one or more layers within the set of layers,
wherein the layer-specific model logic is configured to, in response to an input, generate an output in accordance with the specific context associated with a corresponding layer; and
using the trained AI model, generate a set of overall responses to a command set including: (1) a result and (2) a set of descriptors indicating one or more layer-specific model logics to generate the result by:
applying the layer-specific model logic of one or more layers within the set of layers to the command set,
generating, for the one or more layers, a set of layer-specific responses in accordance with the layer-specific model logic of one or more layers within the set of layers, and
aggregating the sets of layer-specific responses from the one or more layers.

9. The system of claim 8, wherein generating the set of overall responses further causes the system to:
in response to reaching a non-compliance threshold, prevent generating additional sets of layer-specific responses.

10. The system of claim 8,
wherein each layer-specific model logic is constructed by training the AI model on a master dataset, and
wherein the master dataset includes a corresponding set of variables of each layer.

11. The system of claim 8, wherein the instructions further cause the system to:
receive user feedback related to deviations between the set of overall responses of the AI model and a set of desired responses; and
iteratively adjust one or more of: the set of layers or the layer-specific model logic to modify the set of overall responses to the set of desired responses.

12. The system of claim 8, wherein the set of layer-specific responses for each layer includes one or more of:
a binary indicator of one or more variables in corresponding set of variables,
a category of the set of layer-specific responses, or
a probability of the set of layer-specific responses.

13. The system of claim 8, wherein the system is further caused to:
generate confidence scores for one or more sets of layer-specific responses; and
aggregate the sets of layer-specific responses using the generated confidence scores.

14. The system of claim 8, wherein the system is further caused to:
obtain synthetic data including non-sensitive information; and
construct one or more layer-specific model logics of the AI model using the synthetic data.

15. A non-transitory, computer-readable storage medium storing instructions for constructing a layered artificial intelligence (AI) model, wherein the instructions when executed by at least one data processor of a system, cause the system to:
determine a set of layers for an AI model,
wherein one or more layers within the set of layers relates to a specific context associated with the AI model;

using the determined set of layers, train the AI model to construct layer-specific model logic for one or more layers within the set of layers,
   wherein the layer-specific model logic is configured to, in response to an input, generate an output in accordance with the specific context associated with a corresponding layer; and
using the trained AI model, generate a set of overall responses to a command set including: (1) a result and (2) a set of descriptors indicating one or more layer-specific model logics to generate the result.

16. The non-transitory, computer-readable storage medium of claim 15, wherein the instructions further cause the system to:
   identify one or more new layers within the command set; and
   iteratively update the set of layers by adding the one or more new layers to the set of layers.

17. The non-transitory, computer-readable storage medium of claim 15, wherein the instructions further cause the system to:
   weigh a set of layer-specific responses of each layer within the set of layers of the AI model using predetermined weights corresponding with each layer,
   wherein the set of overall responses includes an overall score in accordance with the weighted sets of layer-specific responses.

18. The non-transitory, computer-readable storage medium of claim 15,
   wherein the set of layers is dynamically determined by an ML model, and
   wherein the ML model is configured to identify the specific context associated with the AI model.

19. The non-transitory, computer-readable storage medium of claim 15,
   wherein the set of layers is determined by a received input, and
   wherein the received input indicates the specific context associated with the AI model.

20. The non-transitory, computer-readable storage medium of claim 15, wherein the set of layers is an AI model-specific set of layers, wherein the instructions further cause the system to:
   obtaining an overall set of layers;
   using an ML model, compare the specific contexts within the overall set of layers with the specific context related to the AI model; and
   extract the set of layers from the overall set of layers using the comparison.

\* \* \* \* \*